United States Patent
Daniels et al.

(10) Patent No.: US 7,165,101 B2
(45) Date of Patent: Jan. 16, 2007

(54) TRANSPARENT OPTIMIZATION OF NETWORK TRAFFIC IN DISTRIBUTED SYSTEMS

(75) Inventors: Bruce K. Daniels, Capitola, CA (US); Syed M. Ali, Sunnyvale, CA (US); Robert N. Goldberg, Emerald Hills, CA (US); Yury Kamen, Foster City, CA (US); Peter A. Yared, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 685 days.

(21) Appl. No.: 10/006,310

(22) Filed: Dec. 3, 2001

(65) Prior Publication Data

US 2003/0105833 A1 Jun. 5, 2003

(51) Int. Cl.
*G06F 15/173* (2006.01)
*G06F 3/00* (2006.01)

(52) U.S. Cl. ...................... 709/223; 719/313
(58) Field of Classification Search ............. 709/202, 709/203, 315, 223; 719/313
See application file for complete search history.

(56) References Cited

U.S. PATENT DOCUMENTS

| | | | |
|---|---|---|---|
| 5,822,580 A | 10/1998 | Leung | |
| 5,875,329 A | 2/1999 | Shan | |
| 5,925,100 A | 7/1999 | Drewry et al. | |
| 6,006,230 A * | 12/1999 | Ludwig et al. | 707/10 |
| 6,226,690 B1 | 5/2001 | Banda et al. | |
| 6,230,160 B1 | 5/2001 | Chan et al. | |
| 6,321,274 B1 * | 11/2001 | Shakib et al. | 719/330 |
| 6,772,192 B1 * | 8/2004 | Fulton et al. | 709/203 |
| 6,785,675 B1 * | 8/2004 | Graves et al. | 707/4 |
| 2001/0039581 A1 | 11/2001 | Deng et al. | |

FOREIGN PATENT DOCUMENTS

| | | |
|---|---|---|
| WO | WO 00/23877 | 4/2000 |
| WO | WO 00/058853 | * 10/2000 |
| WO | WO 01/91482 A1 | 11/2001 |

OTHER PUBLICATIONS

International Search Report; Int'l Application No. PCT/US00/00739; Mar. 14, 2000 (22 pgs.).
UK Examination Report dated Jan. 29, 2004 (2 pgs.) GB0228177.2.
Martijn Res; Reduce EJB Network Traffic With Astral Clones; Dec. 2000; pp. 1-7; Java World.
Combined Search and Examination Report; Aug. 20, 2003; pp. 1 PCT/US 99/24510.

* cited by examiner

*Primary Examiner*—Beatriz Prieto
(74) *Attorney, Agent, or Firm*—Osha Liang LLP

(57) ABSTRACT

A distributed system having a client and a server includes a state manager interposed between the client and the server. The state manager has a capability to generate a list of object attributes required to represent a state of the distributed system and a capability to cache object attributes so as to be locally accessible by the client. The distributed system further includes a service component interposed between the state manager and the server. The service component has a capability to fetch data from the server based on the list of object attributes.

15 Claims, 4 Drawing Sheets

TRANSPARENT OPTIMIZATION OF NETWORK TRAFFIC IN DISTRIBUTED SYSTEMS

BACKGROUND OF INVENTION

1. Field of the Invention

The invention relates generally to communication between processes and, more specifically, to a method for optimizing network traffic in distributed systems.

2. Background Art

Modem enterprise applications are typically implemented as multi-tier systems. Multi-tier systems serve the end-user through a tree of client/server pairs. Enterprise systems are typically implemented with a number of components, where each component may contain multiple object instances at runtime. The components are distributed across the client/server pairs. At runtime, each component interacts with other components in the system to provide a set of functions to the system. Typically, a component will require multiple interacts with other components to accomplish a given task.

FIG. 1 shows distributed components 2, 4 in a client/server environment. The component 2 is the client, and the component 4 is the server. The client component 2 uses services from the server component 4 in order to provide functions to the system. As an example, the client component 2 may be a web component hosted on a web server 6, and the server component 4 may be an application component hosted on an application server 8. The client component 2 may contain the logic required to display content on a web browser 10. In order to generate content for the web browser 10, the client component 2 would typically need to access enterprise data, which may be held within a database 12 or within some other persistent data store. The client component 2 interacts with the enterprise data in the database 12 through the server component 4. At runtime, the server component 4 includes one or more objects 14, which may be persistent objects that model data within the database 12 or transient objects that can perform operations such as reading or writing from the database 12 or executing business logic.

At runtime, the client component 2 and the server component 4 belong to different address spaces, which may be in the same machine or in different machines connected by a network link, such as network link 16. Before the client component 2 can invoke a method of a server object 14, the server object 14 must exist in the server component 4. If the server object 14 is not already in the server component 4, the client component 2 needs to call on other objects already in the server component 4 to create the server object 14. Typically, the client component 2 calls on an object factory 18 that knows how to create the server object 14. Once the server object 14 is created or found, the client component 2 can invoke a method of the server object 14 by sending a message to the server object 14. Typically, the client component 2 locates the server object 14 through an object location service 20 that keeps track of the location of all distributed objects in the system. The server object 14 executes the operation requested by the client component 2 and returns the result to the client component 2.

One of the important aspects of distributed applications is remote transparency, i.e., the ability to hide the fact that an object may be located on a different machine, allowing local objects to send messages to the remote object as though the remote object were in the same execution space. Before the client component 2 can send a message to the server object 14, it must know the reference to the server object 14. If the client component 2 and server component 4 are hosted on separate machines, the reference to the server object 14 will be remote, which means that some form of remote procedure call is needed to invoke methods of the server object 14. The client component 2 achieves remote transparency by calling into a stub object 14S, which is a local representation of the server object 14 and implements the visible interface of the server object 14. The stub object 14S forwards the request from the client component 2 to the server object 14 over the network link 16. The stub object 14S also receives the response from the server object 14 over the network link 16 and passes the response to the client component 2. Communication between the stub object 14S and the server object 14 is transparent to the client component 2.

The client component 2 can retrieve or update data contained within the server object 14 by invoking get (accessor) or set (mutator) methods, respectively, on the server object 14. The programmer can use a natural object-oriented coding style for client access of server data, which is terribly inefficient. As a trivial example, the client code below requires six network calls just to access its minimal server data:

```
cust = getCustRef(custID);
name = cust.getName( );
addr = cust.getAddr( );
salesName = cust.getSales( ).getName( );
...
cust.putName(name);
cust.putAddr(addr);
```

Such inefficient distribution code would result in excessive remote calls from the client to the server, which will degrade the scalability and performance of the distributed application. For optimal distribution performance, all needed data should be fetched from and then later stored back to the server with just a single network call. In between, this data should be cached and accessed on the client side as local proxy objects.

The approach described above requires the design of an optimized server application programmer interface (API) and the client proxies for the application. There are software patterns that provide guidelines for hand written optimization at the application design/development stage. See, for example, Martijn Res, "Reduce EJB Network Traffic with Astral Clones," JavaWorld, December 2000. However, it should be noted that the design of an efficient API, such as suggested above, is too hard to accomplish by hand, particularly because the work must be repeatedly performed as the application evolves and is enhanced. For existing applications, i.e., applications that are compiled and ready-to-run, developing an efficient API would mean a total rewrite of the application. This is typically not an attractive option where considerable time and money have been spent on the existing application or resources to develop a new application are not available.

SUMMARY OF INVENTION

In one aspect, the invention relates to a distributed system having a client and a server. The distributed system comprises a state manager interposed between the client and the server and a service component interposed between the state manager and the server. The state manager has a capability to generate a list of data attributes required to represent a state of the distributed system and a capability to cache data attributes so as to be locally accessible to the client. The service component has a capability to fetch data from the server based on the list of data attributes.

In another aspect, the invention relates to a distributed performance optimizer for a distributed application. The distributed performance optimizer comprises a client portion that generates a list of attributes of remote data required to represent a state of the application and that has a capability to cache attributes from the remote data. The distributed performance optimizer further includes a server portion that fetches the attributes from the remote data.

In another aspect, the invention relates to a method for optimizing a distributed application having a client and a server. For each state of the application, the method comprises predicting a set of objects in the server and a set of corresponding object attributes required to represent the state of the application, creating a proxy for each object in the set of objects, prefetching data from the set of objects based on the set of corresponding object attributes, and caching data in the proxy.

In another aspect, the invention relates to a method for optimizing an existing distributed application having a client and a server. The method comprises interposing a distributed performance optimizer between the client and the server such that correspondence between the client and the server is routed through the distributed performance optimizer. The method further includes creating a proxy for data in the server and making the proxy locally accessible to the client, predicting a set of data attributes to fetch into the proxy for a current state of the application, fetching the predicted set of data attributes from the server and storing data attributes in the proxy, and synchronizing data attributes stored in the proxy with data attributes in the server.

In another aspect, the invention relates to a method for optimizing an existing distributed application having a client and a server. The method comprises generating a local representation of the server that is accessible to the client. The method further includes prefetching data from the server into the local representation to represent a state of the application, tracking the changes made to data fetched into the local representation, and synchronizing data in the server with data in the local representation.

Other features and advantages of the invention will be apparent from the following description and the appended claims.

DETAILED DESCRIPTION

The present invention relates to a method for optimizing an existing distributed application. The present invention relates to a method for minimizing client/server roundtrips. Further, the present invention relates to a method for merging services on a client and expanded merged services on the server. The present invention relates to a method for merging services on the service and expanded merged services on the client.

Specific embodiments of the invention are described below with reference to the drawings. In the following description, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
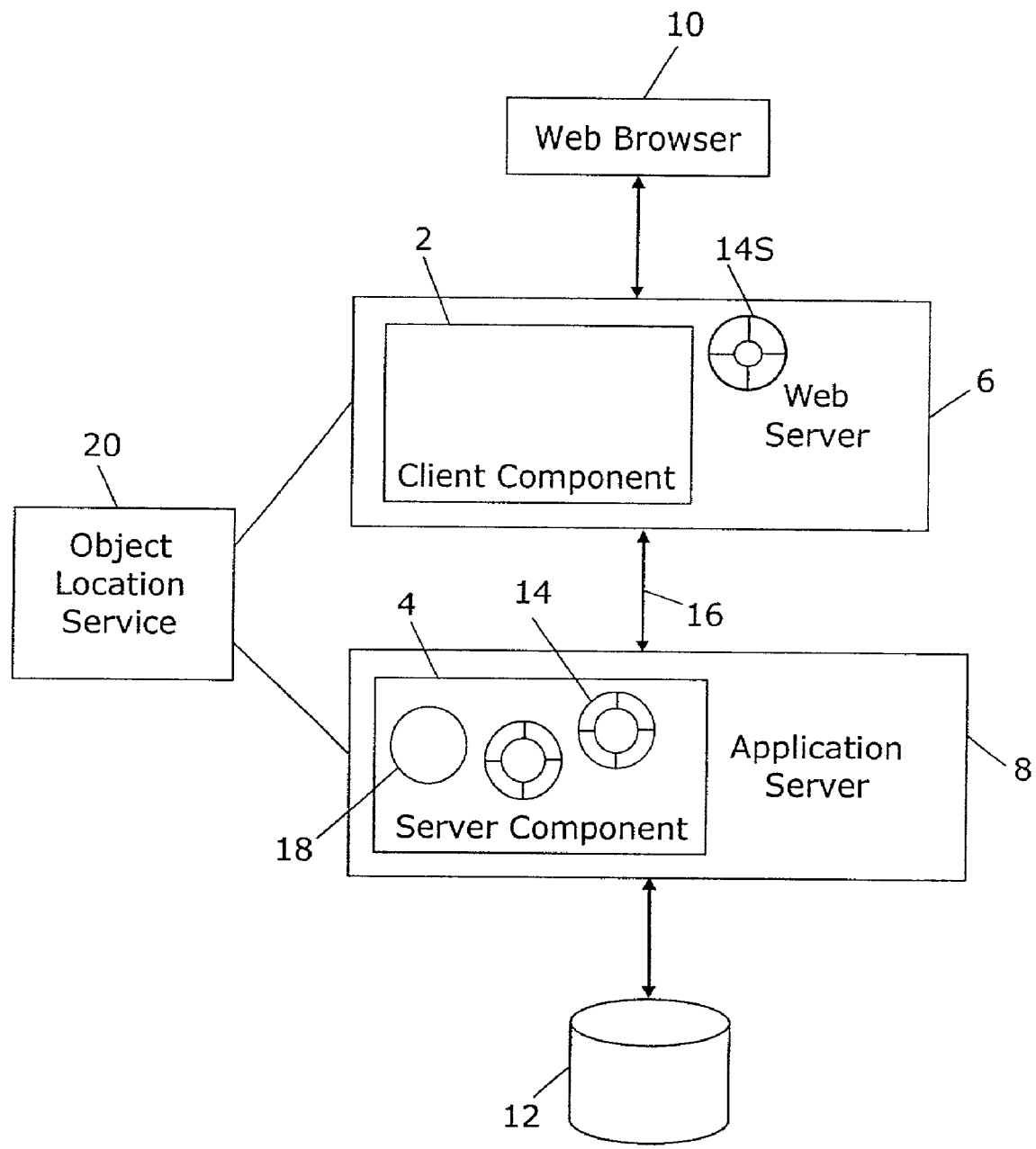
FIG. 1 is a block diagram of a distributed application.
Figure 2:
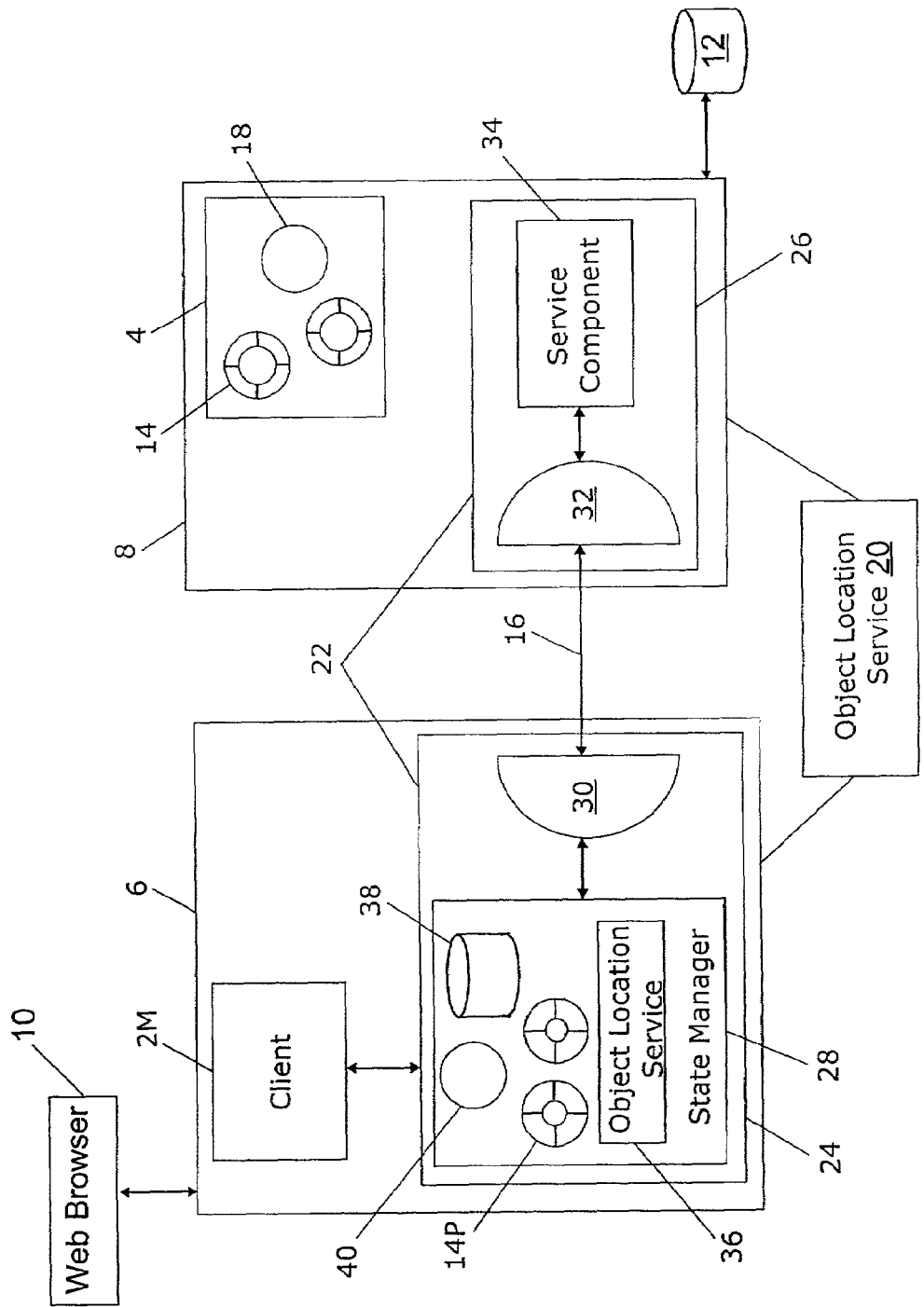
FIG. 2 shows a distributed performance optimizer according to an embodiment of the invention interposed between a client/server pair of the distributed application shown in FIG. 1.

FIG. 2 shows a distributed performance optimizer 22, according to one embodiment of the invention, positioned in between a client component 2M and the server component 4 (previously shown in FIG. 1). The client component 2M is a modified version of the client component 2 (shown in FIG. 1) of the distributed application described in the background section. The client component 2M is modified such that requests normally made to the server component 4 now go to the distributed performance optimizer 22. This allows the distributed performance optimizer 22 to perform various optimization services in addition to processing the requests. The distributed performance optimizer 22 has a client portion 24 that interacts with the client component 2M and a server portion 26 that interacts with the server component 4. The client portion 24 and the server portion 26 of the distributed performance optimizer 22 communicate over the network link 16.

The client portion 24 of the distributed performance optimizer 22 includes a state manager 28 and a transport packager 30. The state manager 28 intercepts calls from the client component 2M in order to insert optimization services, such as prefetching data from the server based on data usage pattern and merging a sequence of remote method calls into a single network call. At runtime, the state manager 28 learns the states and transitions in the application. A state may correspond to information displayed to an end-user, e.g., using the web browser 10. In order to generate the information to display to the end-user, the client component 2M may obtain data from one or more objects in the server component 4, or data from a database 12 connected an application server 8. A transition may correspond to one or more business method calls required to move the application from one state to another. Typically, the transition is initiated through user gestures, such as clicking a mouse or hitting a key. The state manager 28 learns the objects needed to represent each state of the application and prefetches data from the server based on this information. The state manager 28 may be implemented as a runtime library that includes a set of routines that are bound to the client, e.g., client component 2M, at runtime.

The client-side transport packager 30 receives objects from the state manager 28 and packs the objects for transport to the server portion 26. The client-side transport packager 30 also receives object packages from the server portion 26 and unpacks the object packages so that the state manager 28 can access the objects.

The server portion 26 of the distributed performance optimizer 22 includes a server-side transport packager 32 and a service component 34. The server-side transport packager 32 receives object packages from the client-side transport packager 30 and unpacks the object packages so that the service component 34 can access the objects. The server-side transport packager 32 also receives objects from the service component 34 and packs the objects for transport to the client-side transport packager 30. In one embodiment, the service component 34 provides application-independent services to the state manager 28, such as fetching data from the server component 4 based on a usage description from the state manager 28, synchronizing data cached in proxy objects in the state manager 28 with data stored in objects in the server component 4, and invoking method calls on objects in the server component 4.

In order to enable the distributed application to take advantage of the distributed performance optimizer 22, the client component 2M is instrumented such that calls that would normally be made to the server component 4 are now made to the state manager 28. Such calls may include calls for creating, finding, or destroying objects in the server component 4, calls for accessing data stored in objects in the server component 4, and calls for changing data stored in objects in the server component 4. To the client component 2M, the state manager 28 is a local representation of the server component 4. The state manager 28 includes proxies for the objects in the server component 4. The client component 2M interacts with the state manager 28 and proxies in the state manager 28 just as it would with the server component 4 and objects in the server component 4. The process of modifying the client component 2M would include parsing the source code or machine code for the client component 2M and replacing calls for objects in the server component 4 with calls for proxies in the state manager 28.

The state manager 28 processes some of the calls from the client component 2M and invokes services from the service component 34 for calls that need to be processed by the server component 4. In one embodiment, the state manager 28 locally processes calls for getting or setting object attributes and forwards calls for executing logic to the service component 34. The state manager 28 is interposed between the client component 2M and the object location service 20 so that the client component 2M cannot get a reference to the objects in the server component 4 directly. Instead, all correspondences between the client component 2M and the service component 4 are routed through the state manager 28. As previously mentioned, this allows the state manager 28 to insert optimization services into the system. The process for interposing the state manager 28 in between the client component 2M and the object location service 20 includes replacing calls in the client component 2M normally made to the object location service 20 with calls to an object location service 36 that is internal to the state manager 28. The state manager 28 will obtain references to objects in the server component 4 as needed and include the references in the proxies for the objects.

In order for the state manager 28 to be able to create proxies for objects in the server component 4, the state manager 28 must have the appropriate proxy classes in its runtime library. The proxy classes are created by analyzing the server component 4 and determining the definition of objects in the server component 4. This process can involve parsing the machine code or source code (if available) for the server component 4. In some cases, the object definitions can be obtained from a descriptor file deployed with the server component 4. Once the object definitions are determined, the proxy classes can be created for the server objects using the object definitions. The proxy classes would mimic the interface of the server objects and have variables for caching state from the server objects. The proxy classes are included in the state manager 28, where they can be instantiated as needed. The state manager 28 stores references to the proxies inside an object cache 38. As in the case of the server component 4, the state manager 28 may also include one or more object factories 40 that know how to instantiate the proxies.

When a proxy is initially created, it does not contain server data. The state manager 28 determines what attributes (data) to fetch from the server object represented by the proxy based on how the client component 2M uses the attributes of the server object. As previously mentioned, the state manager 28 has a capacity to learn dynamically how the client component 2M uses the objects in the server component 4. The state manager 28 learns by intercepting all calls from the client component 2M and collecting information about the objects and attributes involved in the calls. The state manager 28 then uses the collected information to determine which attributes to fetch into proxies. The information required to determine which attributes to fetch into proxies may also be provided to the state manager 28 from the results of a static analysis of the application. The state manager 28 generates a list of attributes to fetch from the server component 4 and sends the shopping list to the service component 34. The service component 34 then uses the shopping list to fetch data from the objects in the server component 4 and sends the data back to the state manager 28, where they are stored in the appropriate proxies. By sending the list of attributes to the server component 34, all the attributes needed for a particular state of the application can be obtained in a single network call.

The client component 2M can edit the data stored in proxies. The state manager 28 keeps track of the changes made to the proxies. In one embodiment, the state manager 28 does not immediately send changes made to the proxies to the server component 2. Rather, the state manager 28 waits until the application is ready to transition into another state. This transition is usually signaled by the client component 2 sending a request to the state manager 28 to invoke a remote business method on a server object. This remote business method is not a call to access or mutate attributes of the server object. Before the state manager 28 asks the service component 34 to invoke the remote business method, the state manager 28 first calls on the service component 34 to synchronize the server data with the data cached in the proxies. Typically, this involves invoking a method of the service component 34 that takes an object package and a description of what was changed by the client as parameters. The service component 34 updates the server objects using the data stored in the object package and the description of what was changed by the client. After the service component 34 updates the server objects, the state manager 28 then asks the service component 34 to invoke the remote business method. The service component 34 invokes the business method and returns the result to the state manager 28 along with the data modified by executing the business method.

As previously described, the client-side and server-side transport packagers 30, 32 enable objects to be transported between the state manager 28 and the service component 34. Objects typically contain a wealth of data and behavior corresponding to the union of all possible application of those objects. Therefore, objects can be quite large. To optimize the amount of data transferred over the network link 16, the client-side and server-side transport packagers 30, 32 enable the state manager 24 and service component 34 to specify exactly what portions of an object graph to package and send over the network link 16. The term "object graph" means a set of objects that reference each other. When an object is packaged for transport, the objects related to that object are also packaged to ensure that the relationships between the objects are maintained. A subset of an object graph is known as an object graph projection. The client-side and server-side transport packagers 30, 32 can recreate the original object graph with only the data specified in the object graph projection. The object graph projection can be determined based on how the client uses the server objects. The client-side and server-side transport packages 30, 32 package objects for transport using network protocols. The objects are packaged in a format suitable for transport, such as byte stream or XML format.

Figure 3:
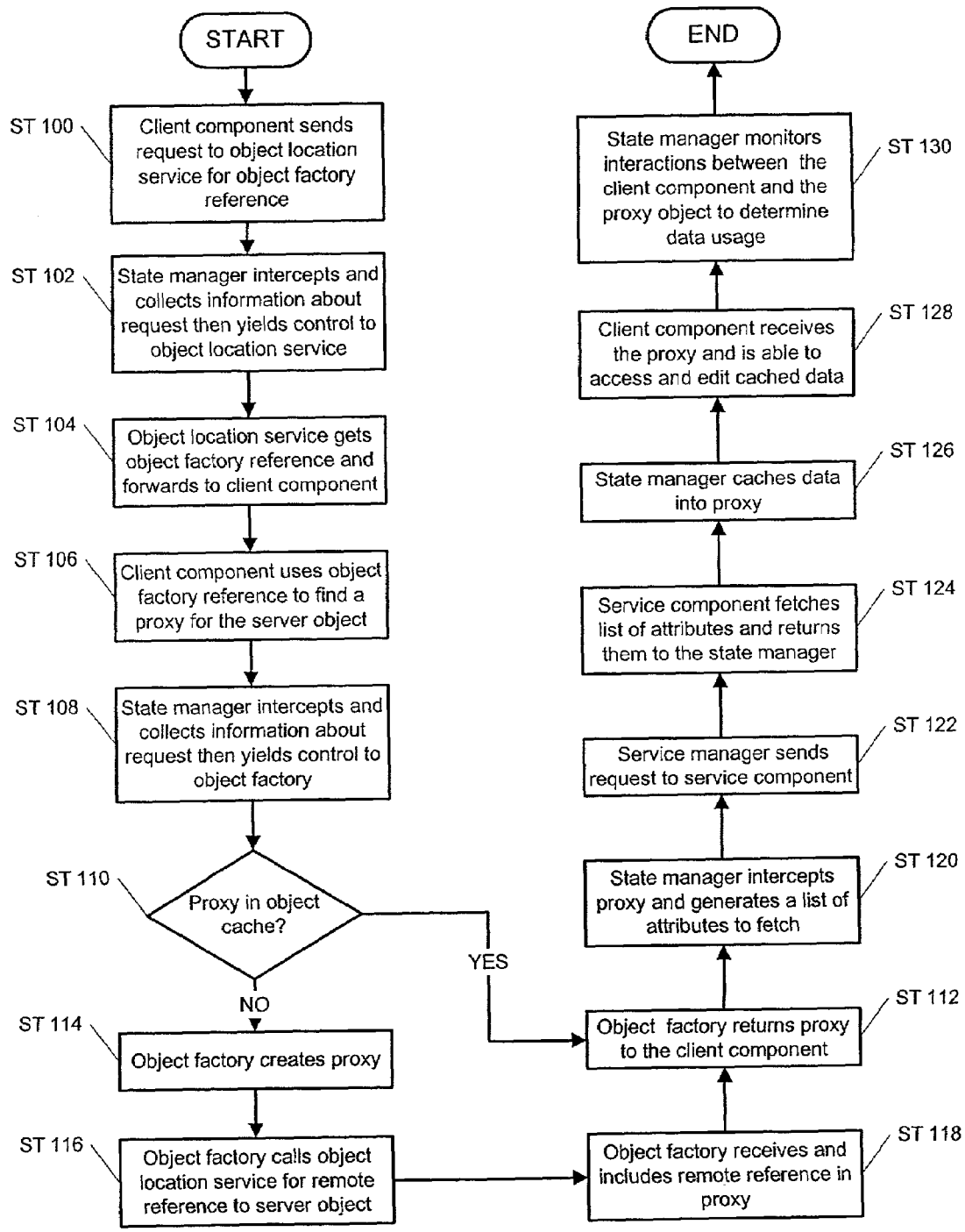
FIG. 3 illustrates, in flowchart form, a typical operation of the system illustrated in FIG. 2.

FIG. 3 illustrates, in flowchart form, a typical operation of the system illustrated in FIG. 2 is described below. The client component 2M sends a request to the object location service 36 for a reference to the object factory 40 (Step 100). The state manager 24 intercepts the request, collects information about the request, and then yields control to the object location service 36 (Step 102). The object location service 36 gets the reference to the object factory 40 and returns the reference to the client component 2M (Step 104). The client component 2 uses the reference to request the object factory 40 to find a proxy 14P for the server object 14 (Step 106). The state manager 24 intercepts the request, collects information about the request, and then yields control to the object factory 40 (Step 108).

The object factory 40 searches the object cache 38 for the proxy 14P (Step 110). If the proxy 14P exists in the object cache 38, the object factory 40 returns the proxy 14P to the client component 2 (Step 112). If the proxy 14P does not exist in the object cache 38, the object factory 40 creates the proxy 14P (Step 114) and then calls the object location service 20 for a remote reference to the server object 14 (Step 116). The object factory 40 includes the remote reference to the server object 14 in the proxy 14P (Step 118). Note that this assumes that the server object 14 actually exists in the server component 4. If the server object 14 does not exist, the server object 14 will have to be created first before the object factory 40 can obtain the reference to the server object 14.

Before returning the proxy 14P and related objects to the client component 2M, the state manager 28 intercepts the proxy 14P and generates a list of its attributes and related objects to fetch into the proxy 14P (Step 120) and sends the request to the service component 34 (Step 124) The service component 34 fetches the list of its attributes and related objects as previously described and returns the data to the state manager 28, where the data is then cached in the proxy 14P (Step 126). Once the client component 2M receives the proxy 14P, the client component 2M can access or edit the server data cached in the proxy 14P (Step 128). The state manager 28 continues to monitor interactions between the client component 2 and the proxy 14P in order to determine how the client component 2 uses the data in the proxy 14P and the changes made to the proxy 14P (Step 130). If the client component 2 requests for an attribute that is not cached in the proxy 14P, the state manager 28 fetches the attribute and adds the attribute to the collection of attributes to prefetch for that particular state of the application. All of these operations, i.e. calling the remote location service for a remote reference to the server object, sending a request list of object attributes, and returning these fetched attributes, can be accomplished in a single client/server roundtrip.

Figure 4:
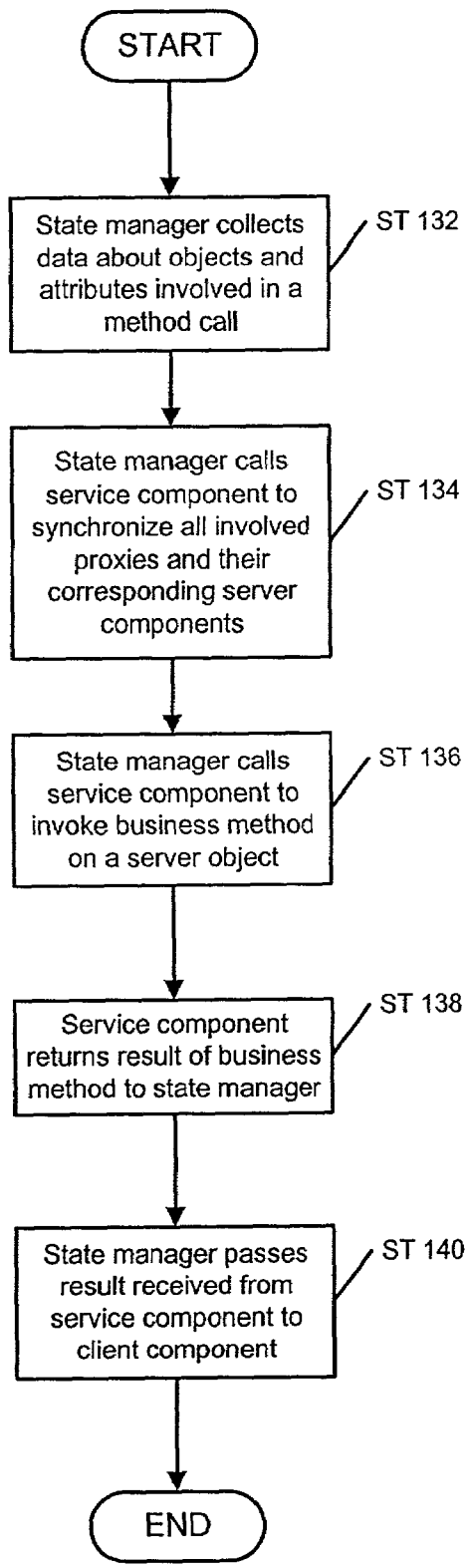
FIG. 4 illustrates, in flowchart form, the typical steps involved in invoking business methods in accordance with the present invention.

FIG. 4, illustrates in flowchart form, the typical steps involved in invoking business methods in accordance with the present invention. The client component 2M may invoke one or more business methods from the interface of the proxy 14P. The business methods are actually implemented in the server object 14. Therefore, the proxy 14P needs to forward the method call to the server object 14. The state manager 24 first collects data about the objects and attributes involved in the method call, i.e., the parameters passed in with the method call (Step 132). Then the state manager 28 calls on the service component 34 to synchronize all involved proxies with their corresponding server objects as previously described (Step 134). Then the state manager 28 calls on the service component 34 to invoke the business method on the server object 14 as previously described (Step 136). The service component 34 returns the result of the business method and any changed data to the state manager 28 (Step 140). All of these operations, i.e., synchronizing proxy data with server data, invoking business method call, and receiving the result of the method call, can be accomplished in a single client/server roundtrip. The state manager 28 passes the result received from the service component 34 to the client component 2M (Step 140).

When the client component 2M no longer needs the proxy 14P, the client component 2M calls on the object factory 40 to destroy the proxy 14P. A similar call may also be made by the state manager 28 to the server component 4 to destroy the server object 14.

The state manager 28 can generate a logic script which contains a sequence of execution instructions to be performed on the server in a single roundtrip. The actions can include invoking business methods on objects in the service component 34, updating objects in the service component 34, and fetching data from objects in the service component 34. The state manager 28 can also learn the business methods required to move from one state of the application and generate a logic script ahead of time based on the current state of the application.

The invention provides one or more advantages. The distributed performance optimizer collects information about how the client uses server data and uses this information to prefetch data from the server. The distributed performance optimizer caches the server data as proxy objects, which can be locally accessed by the client, thus reducing data roundtrips between the client and server. The distributed performance optimizer combines a sequence of remote calls required to put the application in a certain state into a single network call to further reduce the client/server roundtrips. The distributed performance optimizer also transfers the optimum amount of data between the client and server.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A distributed system having a client and a server, comprising:

a state manager interposed between the client and a service component, the state manager having a capability to generate a list of a plurality of data attributes required to represent a state of an application in the distributed system, request the service component to obtain the plurality of data attributes on the list, and cache the plurality of data attributes such that the plurality of data attributes are locally accessible to the client; and the service component interposed between the state manager and the server, the service component having a capability to fetch the plurality of data attributes from the server based on the list, wherein the cache comprises a plurality of proxies, and wherein each of the plurality of attributes is stored in one the plurality of proxies.

2. The distributed system of claim 1, further comprising a transport mechanism interposed between the state manager and the service component, the transport mechanism having a capability to package the plurality of data attributes for transport between the state manager and the service component.

3. The distributed system of claim 1, wherein the state manager comprises means for learning the plurality of data attributes required to represent the state of the distributed system.

4. The distributed system of claim 1, wherein the state manager further comprises means for generating a list of the plurality data attributes that have changed in the plurality of proxies.

5. The distributed system of claim 4, wherein the service component comprises means for updating data using the list of the plurality of data attributes changed in the plurality of proxies.

6. The distributed system of claim 1, wherein the state manager further comprises means for generating an executable instruction comprising a set of method calls to be executed on the server.

7. The distributed system of claim 6, wherein the service component comprises means for interpreting the executable instruction.

8. The distributed system of claim 3, wherein the state manager comprises means for prefetching the plurality of data attributes based on learning which of data attributes are used to represent the state.

9. A distributed performance optimizer for a distributed application, comprising:

a client portion operatively connected to a client configured to generate a list of a plurality of data attributes required to represent a state of the distributed application, request a server portion to obtain the plurality of data attributes on the list, and cache the plurality of data attributes; and the server portion operatively connected to a server configured to fetch the plurality of data attributes from the server based on the list, wherein the client portion is interposed between the client and the server portion, and wherein the server portion is interposed between the client portion and the server, wherein the cache comprises a plurality of proxies, and wherein each of the plurality of data attributes is stored in one the plurality of proxies.

10. The distributed performance optimizer of claim 9, further comprising a transport means that packages the plurality of data attributes for transport between the server portion and the client portion.

11. The distributed performance optimizer of claim 10, wherein the client portion further comprises means for collecting information about the plurality of data attributes accessed in the plurality of proxies.

12. The distributed performance optimizer of claim 10, wherein the client portion further comprises means for generating an executable instruction comprising a set of method calls to be executed on the server.

13. The distributed performance optimizer of claim 12, wherein the service portion comprises means for invoking the executable instruction.

14. The distributed performance optimizer of claim 9, wherein the client portion further comprises means for tracking changes made to the plurality of data attributes cached in the plurality of proxies.

15. The distributed performance optimizer of claim 14, wherein the service component comprises means for synchronizing the plurality of data attributes cached in the plurality of proxies.

* * * * *